United States Patent Office 3,625,739
Patented Dec. 7, 1971

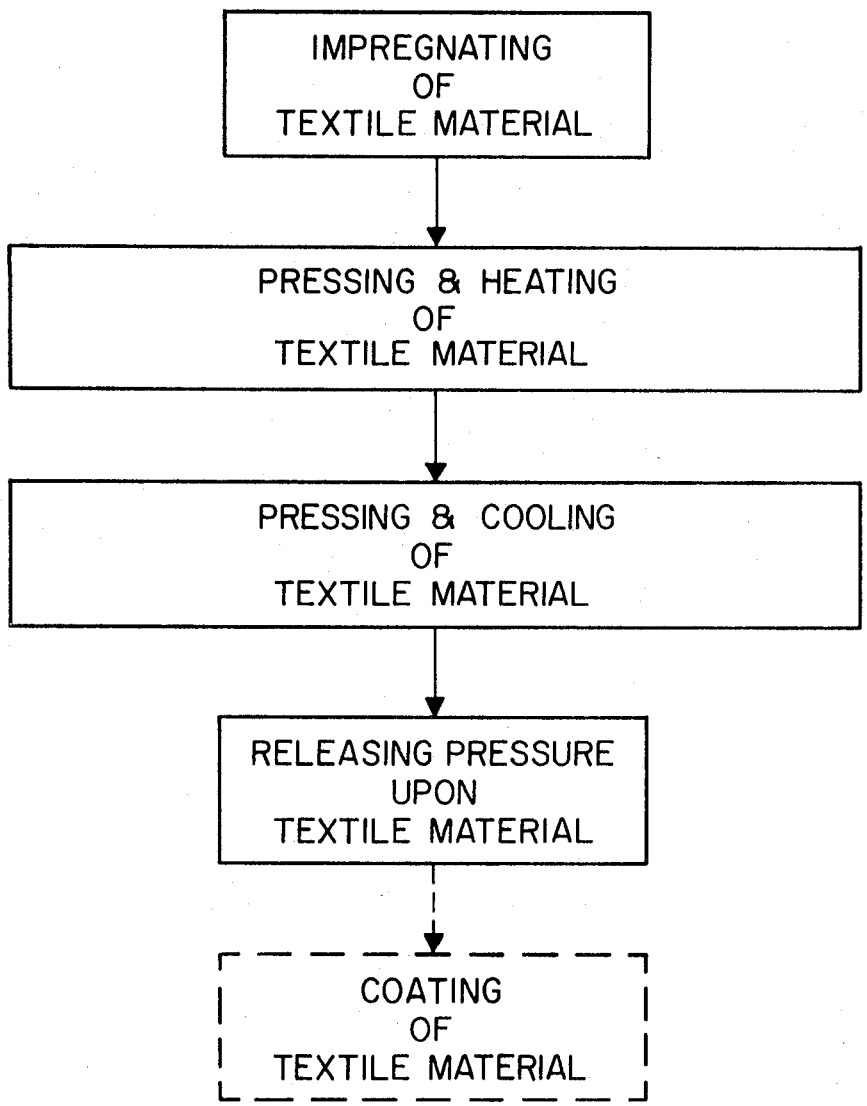

3,625,739
METHOD OF MAKING FORAMINOUS FORMING CONVEYOR
Peter D. Kaspar, Earl C. Francis, and Clifton H. Hubbard, Jr., Dover, Del., assignors to International Playtex Corporation, Dover, Del.
Filed Feb. 16, 1968, Ser. No. 706,067
Int. Cl. B44d 1/44
U.S. Cl. 117—65.2                         13 Claims

ABSTRACT OF THE DISCLOSURE

A method of making a foraminous forming conveyor from textile sheet material having a lace-like design by treating such material so as to provide a dimensionally stable conveyor having flexibility sufficient to allow it to travel in straight and curved paths and further having a flat forming surface for receiving deposited solidifiable material; such deposited material, after solidification, being easily stripped from the forming surface in a continuous and effective manner.

---

The textile sheet material consisting of interconnected strands is impregnated with a plasticized melamine resin of sufficient quantity to fill all the spaces in the strands and the spaces at the interconnection of the strands after which the impregnated material is pressed to form the flat forming surface of the conveyor, heated to curing temperature and then cooled, while under pressure, to provide dimensional stability in the conveyor but still leaving it sufficiently flexible to be driven in various paths.

The flat forming surface of the foraminous conveyor is further treated with a silicone resin after cooling and prior to receiving the deposited solidifiable material to enhance the continuous stripping of the material, after solidification, from the forming surface.

SUMMARY OF THE INVENTION

This invention is a method of making a foraminous forming conveyor having improved stripability from a textile sheet material by impregnating the material with sufficient resin to completely fill the fissures or spaces in the strands and any spaces at the locations the strands cross each other; pressing and heating the resin impregnated material at such temperatures and pressures to cure the resin and to provide a flat forming surface to the conveyor; and, cooling the material, while it is under pressure, to thereby provide a flexible and dimensionally stable forming conveyor.

The foraminous conveyor, thus formed, may be used as a deposition backing or forming means for receiving deposited solidifiable latex particles which, after solidification, may be stripped in layer form from the forming surface of the conveyor to form a deposited latex foraminous sheet material.

Prior to the deposit of the latex particles onto the forming conveyor the forming surface of the conveyor is treated with a silicone resin to further enhance stripping of the latex layer formed on the conveyor from the forming surface of such conveyor.

The foraminous forming conveyor made by the method of this invention is particularly useful in situations where the forming and stripping operations just described are continuous. The conveyor, for example, finds particular utility in a method and apparatus for continuously making foraminous elastic sheet material and composite sheet material, as more fully shown and described in patent application Ser. No. 705,210 filed Feb. 13, 1968 of Peter Kaspar entitled Method of and Apparatus for Forming Foraminous Material and Composite Material.

In such method for making composite material, the foraminous forming conveyor with its flat impervious forming surface suitably treated with silicone resin is driven in a substantially cylindrical configuration past a plurality of depositing means which deposit elastic material in particulate form onto the forming surface of the forming conveyor at a constant substantially normal angle thereto to form with successive depositions a foraminous sheet material or foraminous base ply of desired thickness and having the shape of the forming conveyor. A first material is then laminated to a surface of the base ply while it is still on the forming conveyor, and after lamination, the 2-ply material is stripped from the conveyor and a second material is laminated to its other surface to form foraminous 3-ply composite material. In this method, the forming and stripping operations are continuous.

Since such forming and stripping operations are continuous, it is required that the forming surface of the convyor permits continuous and effective stripping of the material formed on it; otherwise, the entire composite material making method is rendered ineffective. Applicants' method of making the particular conveyor used in the method and apparatus just described provides a conveyor having a highly effective stripping surface, particularly after the surface has been further treated with a silicone resin, and one from which solidified material may be continuously stripped with relative ease. It is important, in addition to good stripping, that the conveyor be dimensionally stable and have a flat depositing or forming surface and adequate flexibility to be driven in curved and straight paths and also so that its strands have vertical sides to enable latex particles not falling on the top forming surface of the conveyor to pass through the interstices defined by the strands of the conveyor and, again, applicants' method comprising this invention provides these desired characteristics.

Both flexibility and dimensional stability are imparted to the foraminous forming conveyor by impregnating it with a melamine resin that has been plasticized. As such, the conveyor is sufficiently flexible that it may be driven in cylindrical paths, for example, without cracking and yet is dimensionally stable enough to provide an acceptable forming surface for deposited solidifiable material.

The impregnating resin must be added to woven or non-woven textile material in sufficient amounts to fill all the spaces and nooks and crannies in the strands of the material and any spaces at the points or areas where the strands are connected to each other or cross each other or are in abutting contact with each other. If such were not the case deposited material could seep into these spaces and hinder the forming operation or the stripping operation or both.

The flexible and dimensional stable conveyor made by the method of this invention has a stripping surface which is adequate for many purposes but it has been found that deposited solidifiable material, such as latex, may be stripped from it with greater ease if it is treated, prior to deposit of such material thereon, with a stripping agent such as silicone resin. This treatment or post treatment of the forming surface coats the forming surface and improves the strippability of such surface particularly when the material stripped from it is solidified latex.

BRIEF DESCRIPTION OF DRAWING

The flow diagram shows the method steps of the invention for making a foraminous conveyor including:
impregnating a textile material
heating and pressing the material, at the same time,
cooling the material while pressure is maintained upon it, and
releasing the pressure to form the foraminous conveyor.

It further shows the further step of coating the surface of the conveyor with a stripping agent to further enhance its strippability.

DESCRIPTION OF THE PREFERRED EMBODIMENT

In the preferred embodiment, a foraminous forming conveyor produced following the method of this invention is made from textile sheet material in the form of bobbinet Dacron lace having the necessary strength, flatness and sufficiently thick interconnected strands.

The textile material is thoroughly wetted with a liquid thermosetting resin composition that has been plasticized to impregnate the threads or strands of the textile material and the spaces at the interconnections of the strands. The impregnated material is then subjected to a simultaneous heating and pressing operation after which it is cooled while still under pressure. The pressure flattens the lace so that it has smooth surfaces everywhere. The smooth surfaces allow removal or stripping of deposited solidifiable material, after it solidifies.

It is to be understood, of course, that the temperature must be high enough to cure the resin and the pressure also must be sufficient to produce a flat forming surface. It should also be understood that any resin solution which has bridges over the interstices in the foraminous material should be removed as by blowing with air to leave the interstices free. With certain plasticized thermosetting resins a pressure of about 500 lb. per square inch maintained for a few minutes at a temperature of about 400° will satisfactorily prepare the impregnated textile material to act as a dimensionally stable, flexible forming conveyor.

The resin composition fills all the fissures or spaces in the strands of the Dacron lace and after heating and cooling provides the necessary rigidity and strand stability to the forming conveyor and at the same time gives it the flexibility required to enable it to be driven in cylindrical paths. The pressing provides the flat forming surface of the forming conveyor so necessary to insure good formation of solidifiable material deposited on this surface and easy stripping of the solidified material from such surface.

Specifically, the preferred method of making the impervious foraminous forming conveyor includes the steps of (1) impregnating the bobbinet Dacron lace sheet material with a resin composition, such resin composition being of the order of between 25% and 35%, and over 15%, of the total weight of the conveyor; (2) pressing the resin impregnated lace material in a heated hydraulic press using pressures of around 575 (400 p.s.i. minimum and 800 p.s.i. maximum) pounds per square inch; (3) raising the temperature of the press to about 375° F. over a 10 minute period; (4) holding the temperature of 375° F. for around 8 minutes; (5) cooling the press for another 3 minute period until it reaches a minimum temperature of 200° F.; and (6) removing the impervious foraminous forming conveyor formed from the textile material from the press, such foraminous conveyor having the desired characteristics of flexibility and dimensional stability.

A suitable resin composition for use in impregnating the lace conveyor is as follows:

| | Parts by weight |
|---|---|
| Melamine formaldehyde resin | 2 |
| Alkyd resin | 2 |
| Xylene | 6 |

The percent solids should be around 25%. The alkyd resin plasticizes the melamine resin and gives the conveyor the desired flexibility. Without the addition of the alkyd resin the forming conveyor treated only with melamine resin would tend to crack, particularly when going through bending moments during travel in curved paths.

It is important that all the fissures and openings in the Dacron lace strands and any spaces at the intersections of the interconnected strands be filled with impregnant; otherwise, latex particles deposited on the forming surface of the forming conveyor will seep into these openings and solidify there and make the stripping of the solidified material from the forming surface of difficult matter. To make sure that the openings and spaces are filled, from 25% to 35%, and preferably 30%, of impregnant or plasticized resin composition (based on the weight of the conveyor) is added to the textile material. The minimum addition of impregnant is 15%.

A pressure of around 400 lbs. p.s.i. to 800 lbs. p.s.i. is required to provide the flat forming surface in the conveyor and smooth surfaces to the strands of the conveyor as the impregnated material is heated at a temperature of about 375° F. to cure the resin. This simultaneous heating and pressing is maintained for about 10 minutes.

To provide dimensional stability to the textile material (i.e., to the conveyor formed from such impregnated material) requires that the material be cooled to at least 200° F. before it is removed from the press. The cooling under pressure imparts dimensional stability to the textile material. If cooling were omitted from the method, the thermosetting plasticized resin would shrivel up, upon the release of pressure.

The foraminous conveyor formed by following the steps above outlined results in a dimensional stable and flexible conveyor which is readily adapted to be used as a foraminous forming conveyor in the method and apparatus shown and described in the aforementioned patent application Ser. No. 705,210, filed Feb. 13, 1968, and for receiving solidifiable latex particles deposited onto the forming surface of forming conveyor at a constant substantial 90° angle to it as the conveyor is driven in a cylindrical path to form, after solidification and stripping from the conveyor, a foraminous rubber sheet material, as taught by such method. The solidified material may be stripped from the forming surface in a continuous manner.

It has been found that the treatment of the flexible conveyor with silicone resin prior to depositing solidifiable material onto its forming surface greatly facilitates continuous stripping the material from this surface after it solidifies.

The flat forming surface of the conveyor is coated with the silicone resin (10% solids in toluene solution) which is heated to cure it, preferably at temperatures of 165° to 200° F. for 20 minutes. To even further enhance the strippability of the conveyor forming surface the coating and heating steps just described are repeated.

Bobbinet lace is particularly suited for use as the conveyor material because it is essential one dimensional and has no over-under strands.

Other textile or cloth-like materials, then bobbinet lace, may be made into flexible foraminous conveyors of the type described by following the method of this invention. Fabrics or cloths or laces having any desired design (lace or floral or pictorial; etc.) may be effectively transformed into flexible deposition or forming conveyors having improved strippability characteristics.

A large variety of thermosetting resins may be used to impregnate the textile material, for example, melamine formaldehyde, melamine urea, melamine urea formaldehyde, phenol formaldehyde, urea formaldehyde resins and the like.

For purposes of this invention "textile material" means a woven or non-woven fabric formed, for example, by weaving, knitting, twisting, crimping or spinning or other known practices for making materials from fibers.

We claim:

1. A method of making a flexible forming conveyor having a flat impervious forming surface of interconnected strands with openings therebetween from a textile sheet material having interconnected strands which comprises the steps of:

impregnating the strands of the textile material with a plasticized thermosetting resin liquid composition sufficient to fill any spaces in the strands of the material and to fill any spaces at the abutment areas of the strands, simultaneously exerting a pressure on at least one surface of the material sufficient to alter the shape of said textile strands to shape said surface to a substantially flat forming surface and heating for a period of time sufficient to cure the resin composition, cooling the heated material while it is under the shaping pressure so as to retain said textile strands in their altered shape and provide dimensional stability to the material, releasing the pressure on the material and removing any excess material from between the strands so as to form a flexible conveyor at least one surface of which having flat impervious strands with openings therebetween.

2. The method of claim 1 in which the resin composition constitutes at least 15% of the total weight of the conveyor.

3. The method of claim 1 in which the resin composition is of the order of between 15% and 35% of the total weight of the conveyor.

4. The method of claim 1 in which the thermosetting resin is a formaldehyde resin.

5. The method of claim 4 in which the formaldehyde resin is taken from a group consisting of melamine formaldehyde, melamine urea formaldehyde, phenol formaldehyde, or urea formaldehyde resins.

6. The method of claim 4 in which the resin is melamine, plasticized by mixing it with an alkyd resin and in which the amount of melamine in the mixture is greater than the amount of alkyd resin in the mixture.

7. The method of claim 1 in which the temperature is raised to about 375° over a ten minute period and is held at said temperature for at least eight minutes.

8. The method of claim 7 in which the material is cooled to at least 200° F. before the pressure is released on the material.

9. The method of claim 1, in which the flat forming surface of the conveyor is coated with silicone resin so as to improve the ease with which solidifiable material deposited on the forming surface may be stripped from such surface after solidification.

10. The method of claim 9 in which the flat forming surface of the conveyor is coated with a silicone resin and toluene solution mixture, said resin being heated to cure it and to form a coating on the forming surface of the conveyor which enhances the strippability of the solidified material from the conveyor.

11. The method of claim 10 in which the resin is heated to temperature of from 165° F. to 200° F. to cure the resin.

12. The method of claim 9 in which the forming surface of the forming conveyor is treated a second time with said silicone resin and toluene solution mixture and heated a second time to cure it.

13. A method of making a flexible forming conveyor having a flat impervious forming surface of interconnected strands having openings therebetween from a textile sheet material having interconnected strands including the steps of:

(1) impregnating a bobbinet lace sheet material with a liquid formaldehyde resin composition said resin composition being of the order of between 25% and 35% of the total weight of the conveyor;

(2) pressing the resin impregnated lace material in a heated hydraulic press using pressures in the range of 400 to 800 pounds per square inch;

(3) raising the temperature of the press to about 375° F. over an approximate 10 minute period;

(4) holding the temperature of 375° F. for around 8 minutes;

(5) cooling the press for around a 3 minute period until it reaches a minimum temperature of 200° F.; and, (6) removing the forming conveyor formed from the textile material from the press, and (7) removing any excess material from between the strands so as to form a flexible conveyor at least one surface of which having flat impervious strands with openings therebetween.

References Cited

UNITED STATES PATENTS

| | | | |
|---|---|---|---|
| 3,458,343 | 7/1969 | Bennett et al. | 117—65.2 |
| 3,394,405 | 7/1968 | Conklin | 117—65.2 |
| 2,940,875 | 6/1960 | Smith et al. | 117—139.5 |
| 2,330,253 | 9/1943 | Whitehead | 161—88 |
| 2,064,360 | 12/1936 | Schur | 117—65.2 |
| 3,169,899 | 2/1965 | Steuber | 161—88 |
| 2,704,730 | 3/1955 | Glatt | 117—98 |
| 1,229,284 | 6/1917 | Kempel | 117—98 |
| 2,050,156 | 8/1936 | Borghetty | 117—98 |
| 1,392,535 | 10/1921 | Stevenson | 117—98 |

FOREIGN PATENTS

| | | | |
|---|---|---|---|
| 917,277 | 1/1963 | Great Britain | 161—88 |

OTHER REFERENCES

Golding, Polymers and Resins, 1959, Van Nostrand Co., pp. 276 to 280.

WILLIAM D. MARTIN, Primary Examiner

M. SOFOCLEOUS, Assistant Examiner

U.S. Cl. X.R.

117—98, 9; 161—88